(12) United States Patent
Poorter et al.

(10) Patent No.: US 8,994,677 B2
(45) Date of Patent: Mar. 31, 2015

(54) TOUCH SENSING STRUCTURE

(75) Inventors: Adjo Poorter, Chu-Nan (TW); Jan Mathijs Meijers, Chu-Nan (TW)

(73) Assignees: Innocom Technology (Shenzhen) Co., Ltd., Shenzhen (CN); Innolux Corporation, Jhu-Nan (TW)

( * ) Notice: Subject to any disclaimer, the term of this patent is extended or adjusted under 35 U.S.C. 154(b) by 217 days.

(21) Appl. No.: 13/541,513

(22) Filed: Jul. 3, 2012

(65) Prior Publication Data

US 2014/0009400 A1   Jan. 9, 2014

(51) Int. Cl.
G06F 3/041 (2006.01)
G06F 3/044 (2006.01)
G02F 1/1333 (2006.01)

(52) U.S. Cl.
CPC .............. G06F 3/041 (2013.01); G06F 3/044 (2013.01); *G02F 1/1333* (2013.01)
USPC .......................................... 345/173; 345/178

(58) Field of Classification Search
CPC ......... G06F 3/041; G06F 3/044; G06F 3/045; G06F 3/0412; G02F 1/1333
USPC ..................... 345/156–184; 349/150; 359/296
See application file for complete search history.

(56) References Cited

U.S. PATENT DOCUMENTS

| | | | |
|---|---|---|---|
| 8,613,671 B2 * | 12/2013 | Miller et al. .................... 463/42 |
| 8,878,081 B2 * | 11/2014 | Kang et al. ................. 178/18.01 |
| 2003/0095111 A1 * | 5/2003 | Song et al. ..................... 345/173 |
| 2008/0165309 A1 * | 7/2008 | Ge et al. ........................... 349/85 |
| 2008/0253101 A1 * | 10/2008 | Takenaka et al. ............. 361/803 |
| 2008/0309865 A1 * | 12/2008 | Sugita et al. .................. 349/150 |
| 2009/0185259 A1 * | 7/2009 | Uchida ......................... 359/296 |
| 2009/0194342 A1 * | 8/2009 | Kuo et al. .................. 178/18.03 |
| 2009/0195516 A1 * | 8/2009 | Kuo et al. ..................... 345/174 |
| 2009/0256820 A1 * | 10/2009 | Yanase et al. ................. 345/174 |
| 2009/0278813 A1 * | 11/2009 | Wijaya et al. ................. 345/173 |
| 2010/0081400 A1 * | 4/2010 | Takahara .................... 455/127.1 |
| 2011/0141042 A1 * | 6/2011 | Kim et al. ..................... 345/173 |
| 2011/0157087 A1 * | 6/2011 | Kanehira et al. ............. 345/174 |
| 2011/0169759 A1 * | 7/2011 | Wang et al. ................... 345/173 |
| 2011/0216023 A1 * | 9/2011 | Kurokawa et al. ............ 345/173 |
| 2011/0234964 A1 * | 9/2011 | Moriwaki ..................... 349/149 |
| 2011/0242027 A1 * | 10/2011 | Chang .......................... 345/173 |
| 2011/0304571 A1 * | 12/2011 | Kim et al. ..................... 345/173 |
| 2013/0093726 A1 * | 4/2013 | Kuo et al. ..................... 345/174 |
| 2013/0229383 A1 * | 9/2013 | Kuo et al. ..................... 345/174 |
| 2013/0300618 A1 * | 11/2013 | Yarga et al. ................... 343/720 |

* cited by examiner

*Primary Examiner* — Prabodh M Dharia
(74) *Attorney, Agent, or Firm* — Liu & Liu

(57) ABSTRACT

A touch sensing structure including a central area and a border area, including: a display panel, including: first substrate; and a second substrate opposite to the first substrate, wherein the second substrate comprises in the border area a recess that partially exposes the first substrate; a main flexible printed circuit (FPC) and a touch flexible printed circuit (FPC) laterally juxtaposed in the border area, wherein the main FPC is bonded to an exposed portion of the first substrate and electrically connected to a first driving element, wherein the touch FPC is bonded to the second substrate and electrically connected to a second driving element; and a touch sensing unit disposed on the second substrate and electrically connected to the touch FPC.

20 Claims, 10 Drawing Sheets

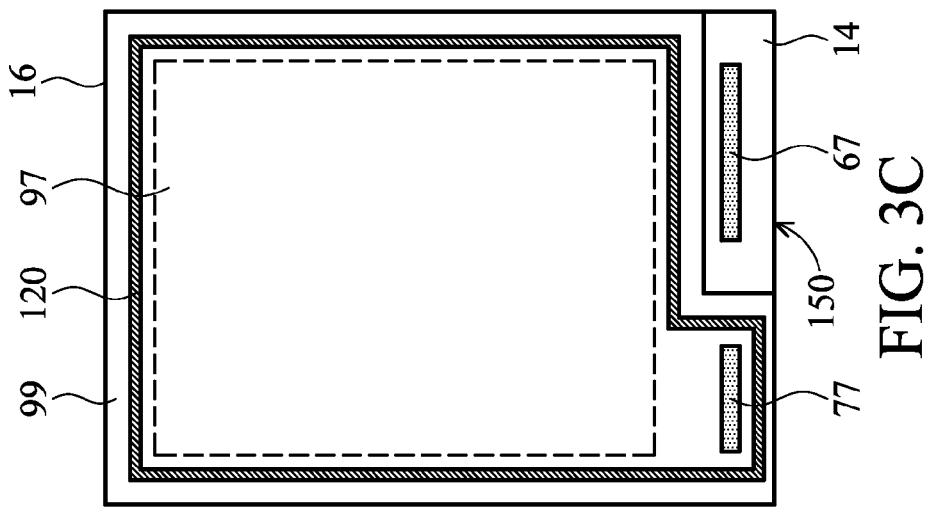
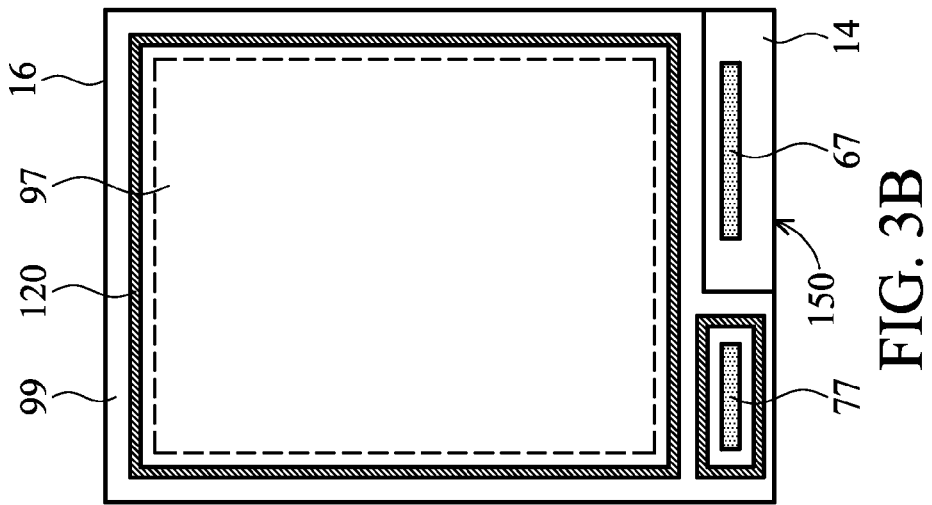
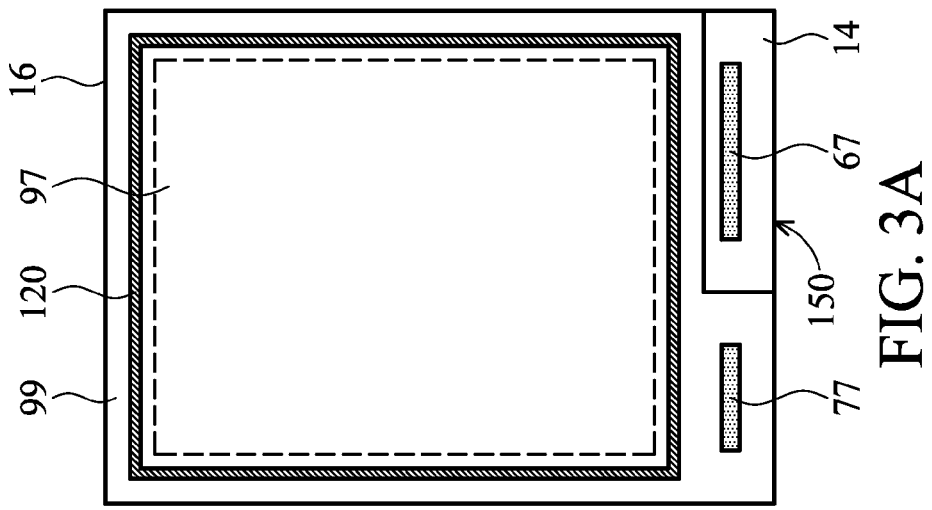

TOUCH SENSING STRUCTURE

BACKGROUND

1. Technical Field

The present disclosure relates to a touch sensing structure, in particular, relates to a touch sensing structure with a narrow border area.

2. Description of the Related Art

Demand for electronic devices provided with touch sensing functionality has risen in recent years. Specifically, electronics devices such as mobile phones, PDAs and tablet computers that integrate touch sensing functionality into a display device have become increasingly popular due to ease of operation and its potential in versatile applications, and these devices can be referred to as touch screens or touch sensing structures. Depending on how the touch sensing functionality is integrated into the display device, several types of touch screens have been developed, for example the out-cell type touch screens, in-cell type touch screens, and on-cell type touch screens. The user can perform various functions on the touch screens by touching the screen (or touch sensitive area, or active region) using a finger, a stylus, or other object. The screen is surrounded by a non-transparent border area which does not provide the touch sensing function, and the purpose of the border area is to prevent the user from seeing the wiring layer and the other elements underneath the border area. Since the size of the border area limits the screen space available for the user, for a given touch screen size, it is desirable to minimize the border so that the screen can be maximized.

BRIEF SUMMARY

The disclosure relates to a touch sensing structure comprising a central area and a border area, comprising: a display panel, including: a first substrate; and a second substrate opposite to the first substrate, wherein the second substrate comprises in the border area a recess that partially exposes the first substrate; a main flexible printed circuit (FPC) and a touch flexible printed circuit (FPC) laterally juxtaposed in the border area, wherein the main FPC is bonded to an exposed portion of the first substrate and electrically connected to a first driving element, wherein the touch FPC is bonded to the second substrate and electrically connected to a second driving element; and a touch sensing unit disposed on the second substrate and electrically connected to the touch FPC.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein:

FIG. 3A-3C are top views of a touch sensing structure further comprising a sealant according to embodiments of the disclosure.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

In this specification, expressions such as "overlying the substrate", "above the layer", or "on the film" simply denote a relative positional relationship with respect to the surface of the base layer, regardless of the existence of intermediate layers. Accordingly, these expressions may indicate not only the direct contact of layers, but also, a non-contact state of one or more laminated layers.

Figure 1B:
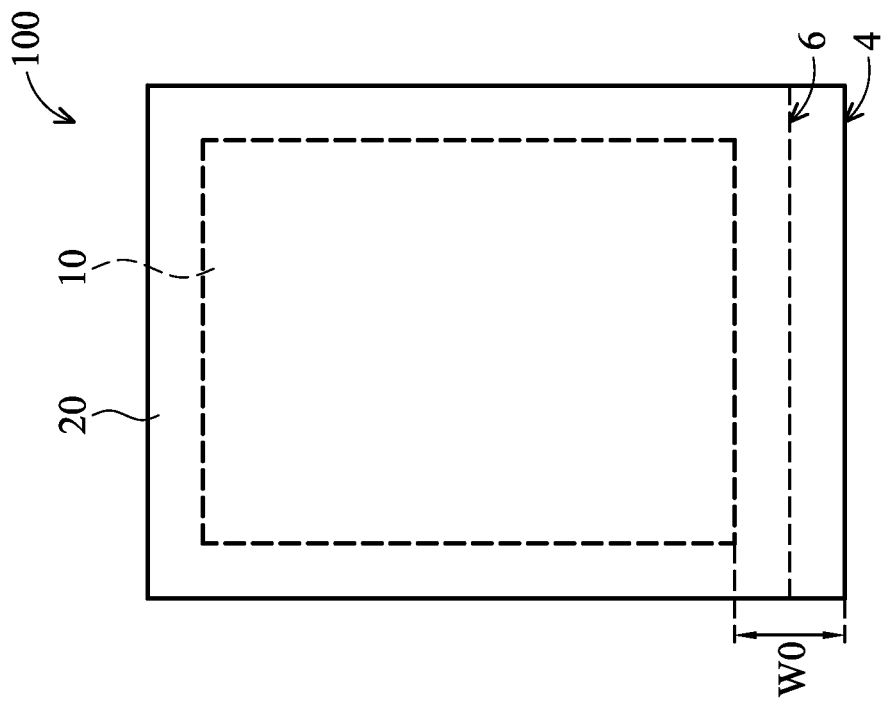
FIG. 1B is a top view of a conventional LCD device provided with touch sensing functionality.
Figure 1A:
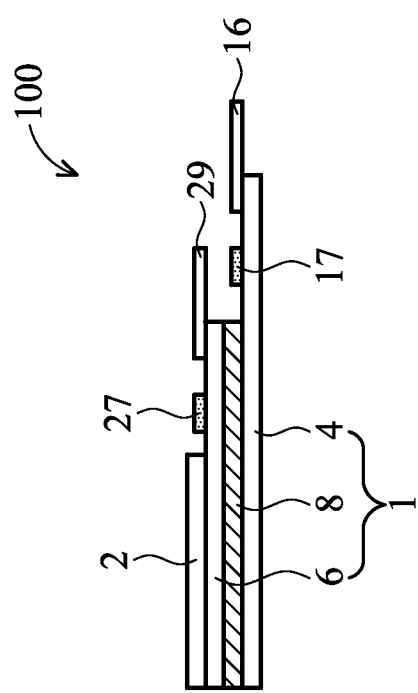
FIG. 1A is a side view of a conventional liquid crystal display (LCD) device provided with touch sensing functionality.
Figure 1C:
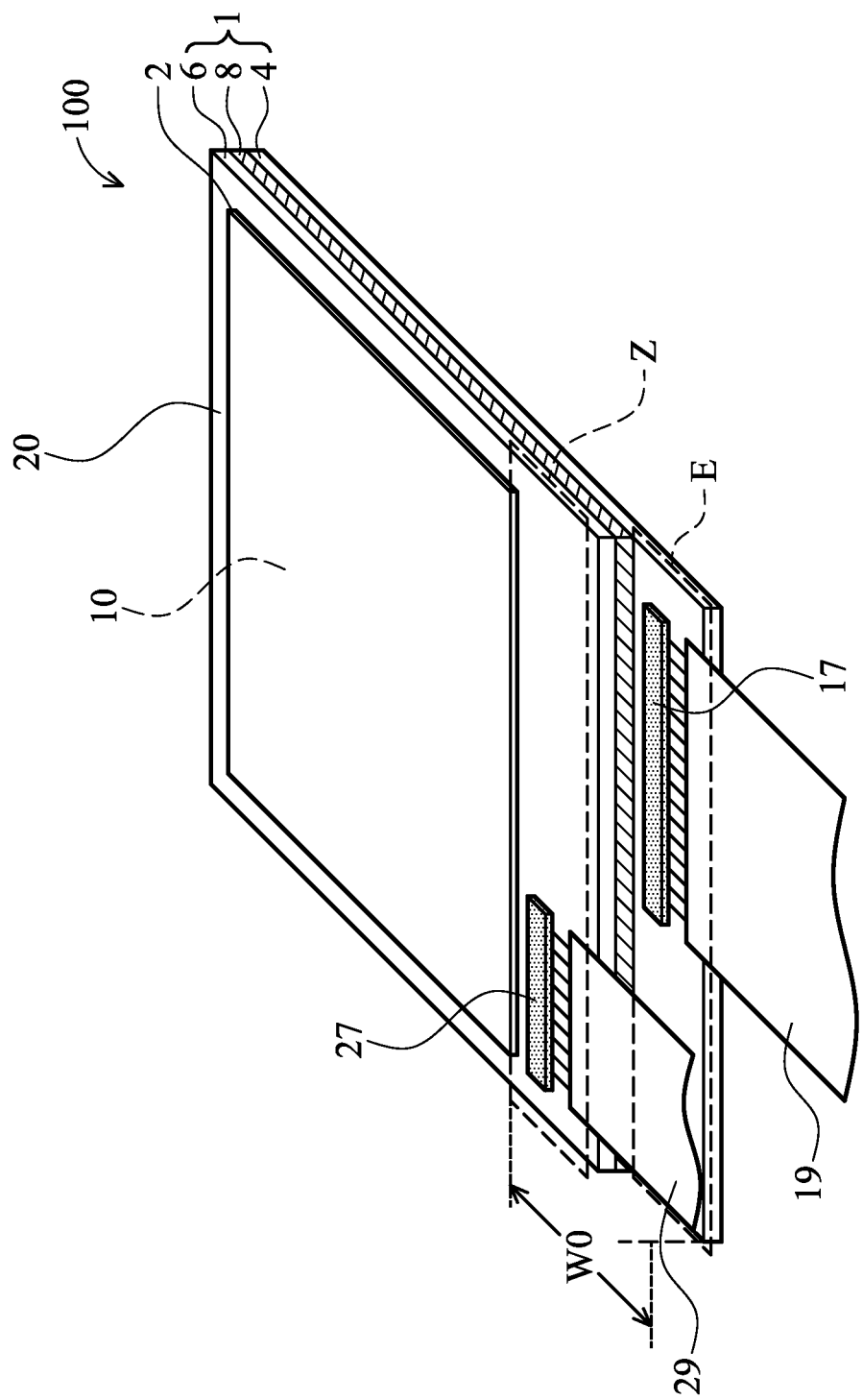
FIG. 1C is a perspective view of a conventional LCD device provided with touch sensing functionality.

FIG. 1A is a side view of a conventional liquid crystal display device (LCD) 100 provided with touch sensing functionality. It is noted that the structure of the liquid crystal display device 100 has been simplified for illustrative purposes. The LCD device 100 may comprise an LCD panel 1 and a touch sensing unit 2 disposed on the LCD panel 1. In the orientation shown in FIG. 1A, the LCD panel 100 comprises two opposing substrates, which are a thin film transistor (TFT) array substrate 4 at the bottom and a color filter (CF) substrate 6 at the top, wherein a liquid crystal layer 8 is sandwiched between the two substrates 4 and 6. FIG. 1B is a top view of the conventional LCD device 100 provided with touch sensing functionality. As shown in FIG. 1B, the LCD device 100 may comprise a touch sensitive area 10 and a border area 20 surrounding the touch sensitive area 10. The touch sensing unit 2 may be formed on the color filter substrate 6 in both the touch sensitive area 10 and the border area 20. FIG. 1C is a perspective view of a conventional LCD device provided with touch sensing functionality. To accommodate for the disposal of a display driving element 17, which drives the LCD panel 1, on the TFT array substrate 4, the color filter substrate 6 is adapted to have a smaller size compared with the TFT array substrate 4. Generally, the color filter substrate 6 may cover the entire TFT array substrate 4 except for an edge portion E of the TFT array substrate 4 in the border area 20, as shown in FIG. 1C. Thus, the edge portion E of the TFT array substrate 4 is exposed for the display driving element 17 to be disposed thereon. A main flexible printed circuit (FPC) 19 may also be disposed on the exposed edge portion E of the TFT array substrate 4. The main FPC 19 may be electrically connected with the display driving element 17. In addition, a touch driving element 27 may be disposed on the edge portion Z of the color filter substrate 6. The touch driving element 27 may electrically connect the touch sensing unit 2 to a touch FPC 29. For the display device 100 described above in reference to FIG. 1A-1B, the width or size W0 of the border area 20 is determined by a distance from the inner edge of the edge portion Z to the periphery of the TFT array substrate 4.

Figure 2A:
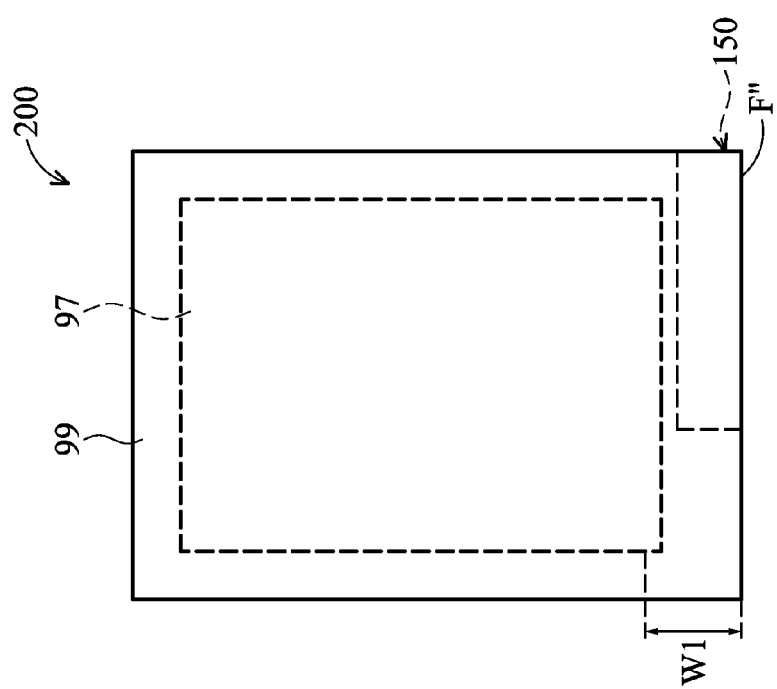
FIG. 2A is a top view of a touch sensing structure according to embodiments of the disclosure.
Figure 2C:
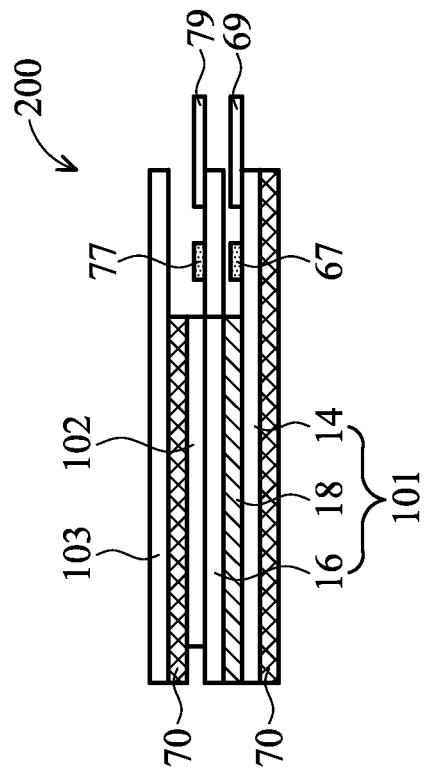
FIG. 2C is a side view of a touch sensing structure further comprising a polarizer according to embodiments of the disclosure.
Figure 2B:
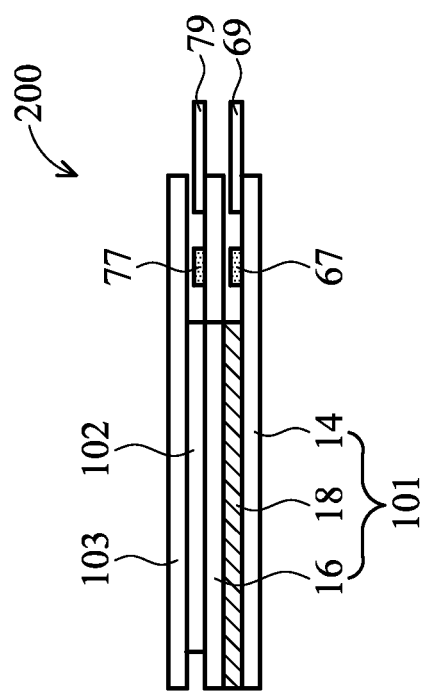
FIG. 2B is a side view of a touch sensing structure according to embodiments of the disclosure.

The configuration of the touch sensing structure 200 according to embodiments of the disclosure will now be described in reference to FIG. 2A to 2H. The configuration of touch sensing structure 200 has been simplified for illustrative purposes. FIG. 2A is a top view of a touch sensing structure 200 according to embodiments of the disclosure. As shown in FIG. 2A, the touch sensing structure 200 may comprise a central area 97 surrounded by a border area 99. The central area 97, as opposed to the border area 99, is where the user can operate and perform various functions. Thus, the central area 97 may be referred to as a touch sensitive area 97. FIG. 2B is a side view of the touch sensing structure 200 according to embodiments of the disclosure. The touch sensing structure 200 may comprise a display panel 101 and a touch sensing unit 102 disposed on the display panel 101. The touch sensing structure 200 may further comprise a cover substrate 103 over the touch sensing unit 102. In some embodiments, a polarizer 70 (FIG. 2C) may be formed on each of the first substrate 14 and the second substrate 16 on a side opposite to the display medium 18. In these embodiments, the polarizer 70 on the second substrate 16 may be formed between the touch sensing unit 102 and the cover substrate 103. In other embodiments, a polarizer (not shown) may be formed between the first substrate 14 and the second substrate 16.

Figure 2D:
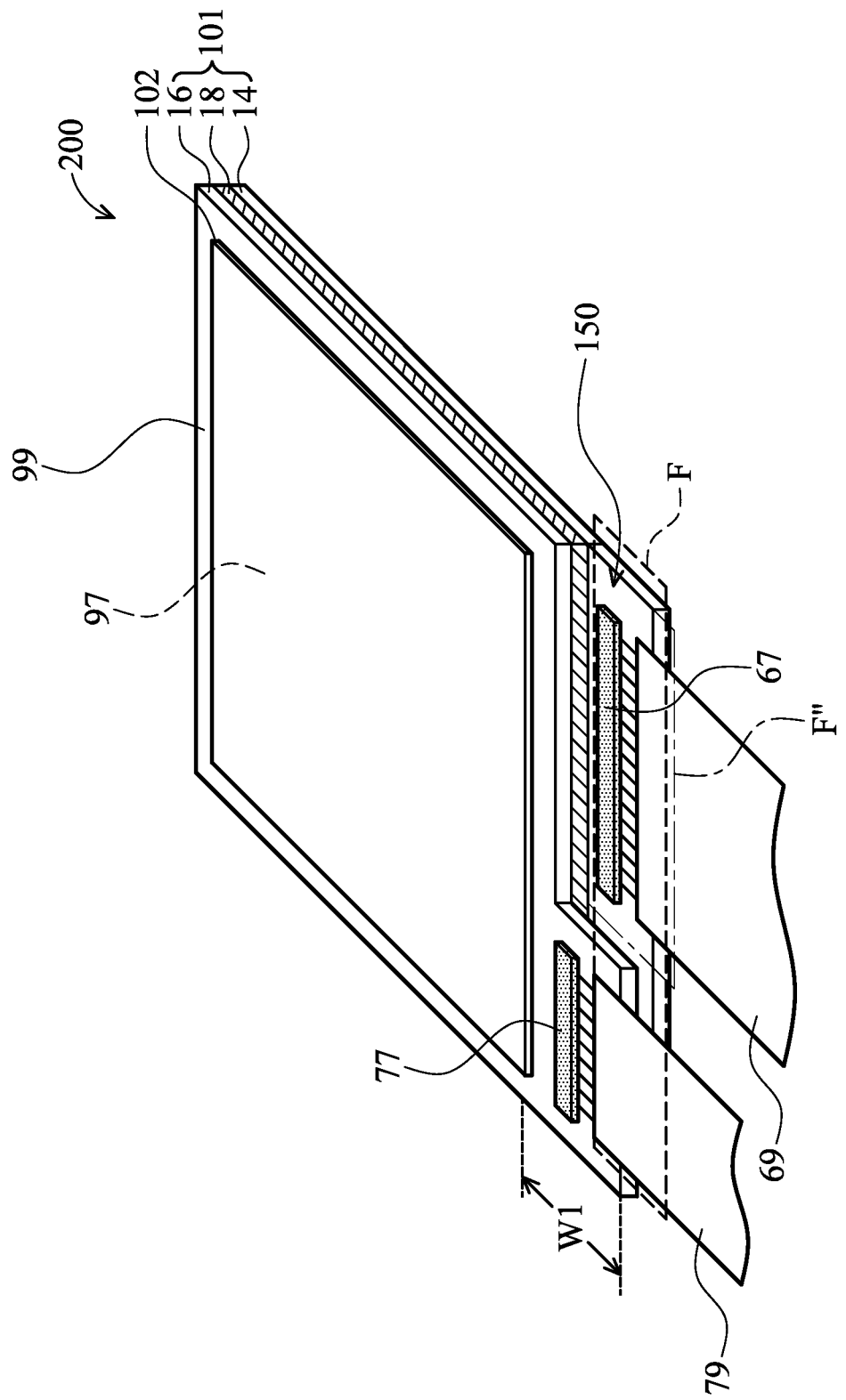
FIG. 2D-2H are perspective views of a touch sensing structure according to embodiments of the disclosure.
Figure 2E:
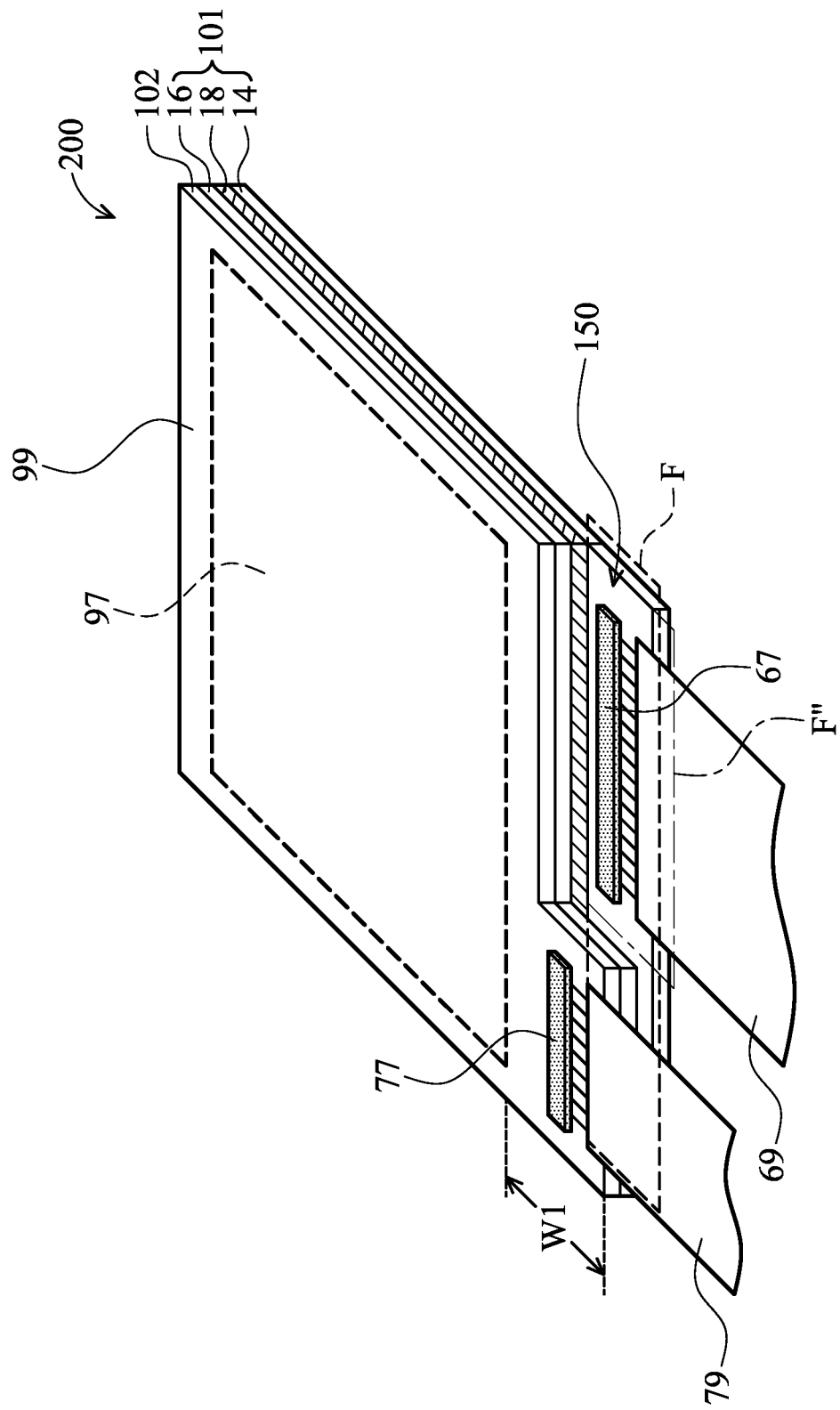

The display panel 101 will be described in more detail below. The display panel 101 may be any display panel capable of displaying in response to the signals generated at the touch sensing unit 102 when a user touches the touch sensing structure 200 in the touch sensitive area 97. The touch sensing unit 102 may comprise, in the touch sensitive area 97, a plurality of first touch sensing electrodes and a plurality of second touch sensing electrodes, wherein the first touch sensing electrodes and the second touch sensing electrodes cross each other. In some embodiments, the first touch sensing electrodes and the second touch sensing electrodes may cross each other at 90 degree angles. In other embodiments, the touch sensing unit 102 may be a co-planner touch array. The touch sensing unit 102 may comprise transparent conductive oxides such as indium tin oxide, indium oxide, silicon indium oxide, aluminum zinc oxide, indium zinc oxide, antimony tin oxide or tin oxide. Preferably, the touch sensing unit 102 may be fabricated directly on the second substrate 16 in the touch sensitive area 97 as shown in FIG. 2D. However, the touch sensing unit 102 may alternatively be a touch panel as shown in FIG. 2E. The touch sensing unit (or touch panel) 102 may be separately fabricated before being disposed on the display panel 101. The touch panel may be disposed on the display panel 101 by bonding with an optically clear adhesive for example. In the orientation shown in FIG. 2B, the display panel 101 may comprise a first substrate 14 at the top, a second substrate 16 at the bottom opposite to the first substrate 14, and a display medium 18 sandwiched between the first and second substrates 14, 16. Each of the first substrate 14 and the second substrate 16 may comprise glass, plastic, or other suitable materials. In some embodiments, the display panel 101 may be a liquid crystal display (LCD) panel, wherein the first substrate 14 may be a TFT array substrate, the second substrate 16 may be a CF substrate, and the display medium 18 may comprise a liquid crystal medium. In other embodiments, the display panel 101 may be an organic light-emitting diode (OLED) display panel or a polymeric light emitting diode (PLED) panel, and the display medium 18 may comprise an organic light-emitting medium. FIG. 2D is a perspective view of the touch sensing structure according to embodiments of the disclosure. Similarly, to accommodate for additional elements that drive the LCD panel 101, the second substrate 16 may be adapted to be smaller than the first substrate 14. According to an important feature of the disclosure, the second substrate 16 may comprise in the border area 99 a recess 150 that partially exposes the first substrate 14 so that only a portion of the second substrate 16 remains in the border area 99. The recess 150 may be formed using any known method such as a cutting method. The cutting method may be for example a dice cutting method or a laser cutting method. As shown in FIG. 2A, the recess 150 may be formed at a corner of the first substrate 14 so that the corner is exposed. Thus, instead of exposing an edge portion F of the first substrate 14 entirely, the edge portion F is exposed partially to give an exposed portion F", as shown in FIG. 2D.

Figure 2F:
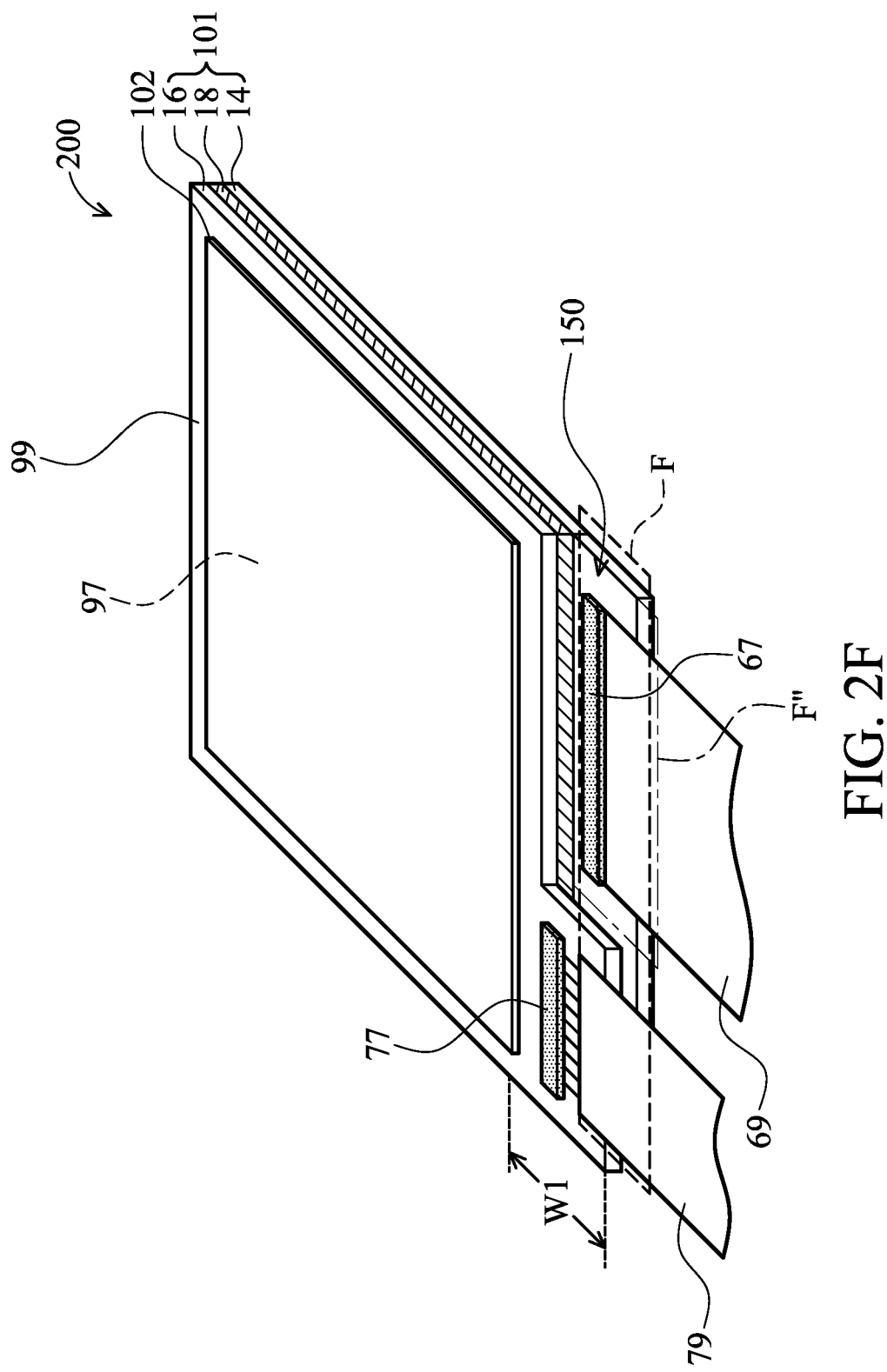
Figure 2G:
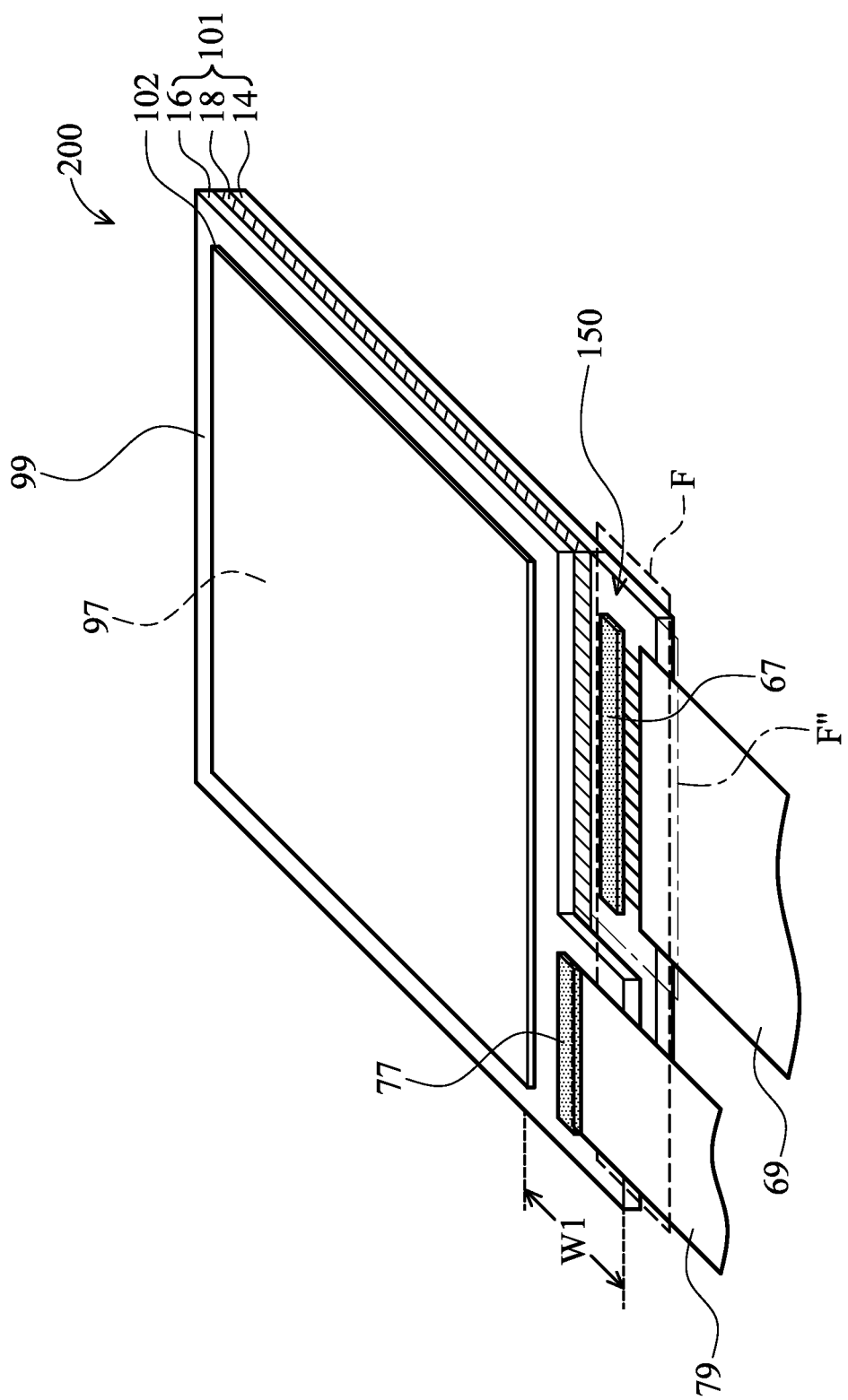

Referring to FIG. 2D, since the edge portion F of the second substrate 16 is partially exposed, a main FPC 69 and a touch FPC 79 may be laterally juxtaposed in the border area 99. More specifically, the main FPC 69 may be bonded to the exposed portion F" of the first substrate 14 and electrically connected to a first driving element (or display driving element) 67, and the touch FPC 79 may be bonded to the second substrate 16 and electrically connected to a second driving element (or touch driving element) 77. The second driving element 77 may be laterally juxtaposed with the first driving element 67 in the border area 99. In this manner, the width W1 of the border area 99 is reduced because compared with the device 100 shown in FIG. 1A to 1C, the touch FPC 79 and the second driving element 77 of the touch sensing structure 200 have been moved outwards towards the periphery of the touch sensing structure 200. At least one advantage of touch sensing structures having a narrow border area may comprise providing the user a larger screen which allows for easier viewing and operation. The main FPC 69 and the touch FPC 79 may be further electrically connected to external circuits and signal processing systems. Preferably, the main FPC 69 and the touch FPC 79 may be separately bonded directly on the first substrate 14 and the second substrate 16 in the border area 99 as shown in FIG. 2D. Alternatively, the main FPC 69 and the touch FPC 79 may be separately bonded directly on the first substrate 14 and the touch sensing unit 102 in the border area 99 as shown in FIG. 2E. The first driving element 67 may be for example a display driving integrated circuit (IC). In some embodiments, the first driving element 67 for driving the display panel 101 may be disposed on the exposed portion F". In other embodiments, the first driving element 67 may be integrated onto the touch FPC 69 (FIG. 2F). In some embodiments, the second driving element 77 may be disposed on the second substrate 16. In other embodiments, the second driving element 77 may be integrated onto the touch FPC 79 (FIG. 2G). However, these electrically connecting manners described above are only provided for illustration rather than to limit this disclosure, and those skilled in the art may adjust the connecting manner of the disclosure depending on practical requirements.

Figure 2H:
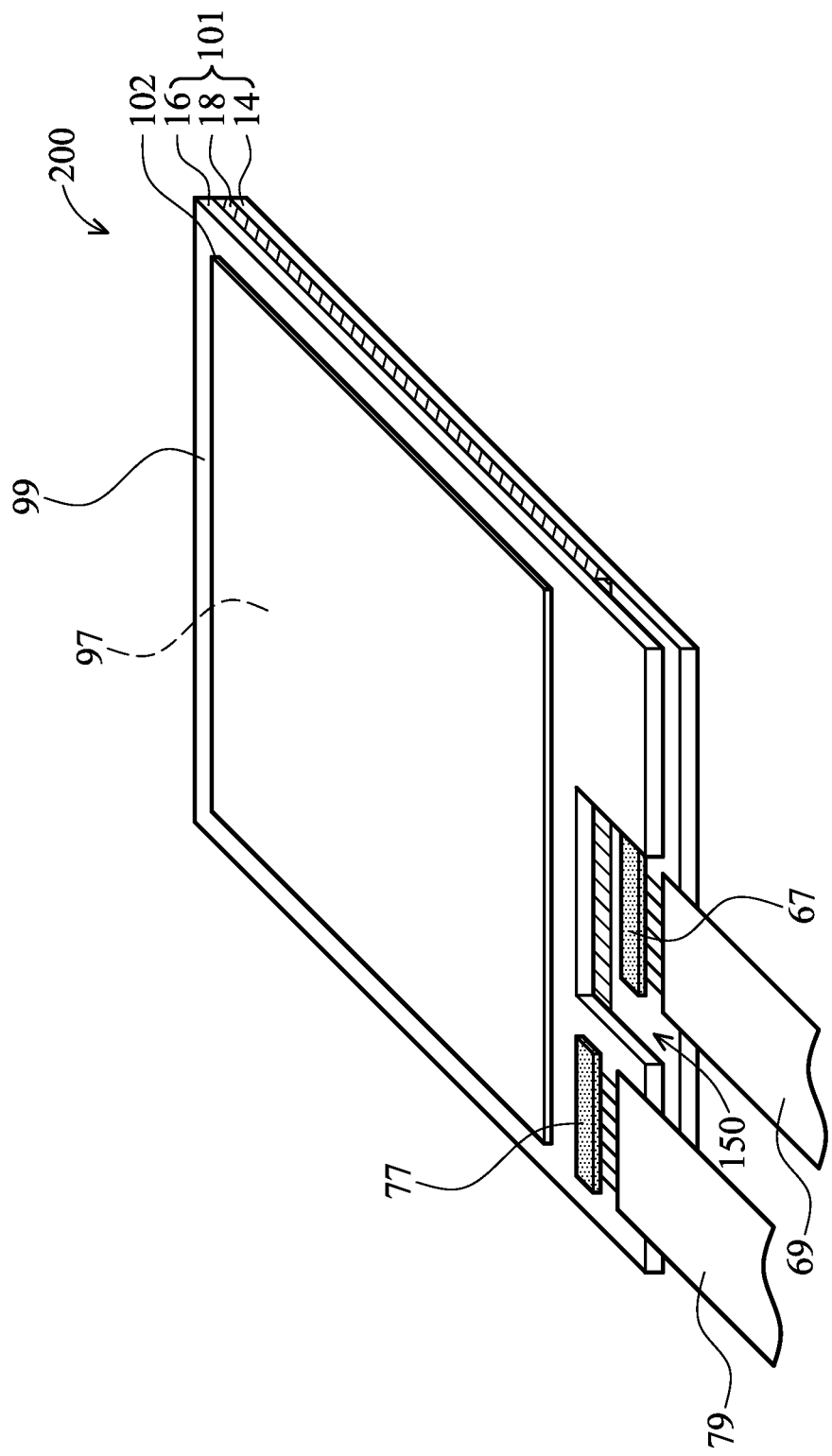

Although the recess 150 is shown as a rectangular shape and located at the corner of the first substrate 14 in FIG. 2D, depending on practical requirements the recess 150 may be in other forms as long as the edge portion F is partially exposed. Thus, the recess 150 may vary in number, location, size, and shape. The recess 150 may have any desired shape such as a rectangular, trapezoidal, hexagonal, and octangonal shape, but is not limited thereto. Referring to FIG. 2H, the recess 150 may be formed in a middle region of the border area 99. The number of the recess 150 may be one or more. In some embodiments, more than one recess 150 are formed. Further, It is understood that although the above descriptions of the touch sensing structure 200 in reference to FIG. 2A-2H only describe the recess 150 to be in the border area on one edge portion E, it is possible to apply the inventive concept of the disclosure so that the recess is formed on another edge portion or other edge portions of the touch sensing structure 200.

Referring to FIG. 3A, the display panel 101 may further comprise a sealant 120 between the first and second substrates 14, 16 for sealing the display medium 18 therein. The sealant 120 prevents the display medium 18 from coming into contact with the outside environment or from leaking out. The touch sensing structure 200 as shown in FIG. 2B will be taken as an example for the layout of describing the sealant 120. However, it is understood that the sealant 120 may also be applied in other embodiments of touch sensing structures according to the disclosure. As shown in FIG. 3A, the sealant 120 may be formed between the first and second substrates 14, 16 along the periphery of the central area. Alternatively, the sealant 120 may further be formed in an area next to the recess as shown in the embodiments of FIGS. 3B and 3C. The embodiment shown in FIG. 3B is similar to that shown in FIG. 3A except that the sealant 120 may further be formed along the periphery of the remaining portion of the second substrate 16 in the border area 99. Referring to the embodiment shown in FIG. 3C, the sealant 120 may be formed following the contour of the second substrate 16. The advantage of the embodiments shown in FIGS. 3B and 3C may comprise improved process yield in recess removal. Improved process yield may be due to several reasons, for example, the sealant 120 may better define the recess 150, and the sealant 120 may provide extra stability and stress relief to help prevent crack formation in the substrate(s) when forming the recess 150. For the embodiment shown in FIG. 3C, since the display medium 18 may be included in the border area between the first and second substrates 14, 16, it allows more space for the display medium 18.

As described above, by providing a recess in the border area to partially expose the lower substrate of the display panel, the touch sensing structure according to embodiments of the disclosure allows elements such as FPCs (and driving elements) to be laterally juxtaposed in the border area. Thus, the touch sensing structure according to the disclosure has a narrow border area so that the screen area (or touch sensitive area) may be increased to provide easier viewing and operation for the user.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch sensing structure comprising a central area and a border area, comprising:
    a display panel, including:
    a first substrate; and
    a second substrate opposite to the first substrate, wherein the second substrate comprises in the border area a recess that partially exposes the first substrate;
    a main flexible printed circuit (FPC) and a touch flexible printed circuit (FPC) laterally juxtaposed in the border area, wherein the main FPC is bonded to an exposed portion of the first substrate and electrically connected to a first driving element, wherein the touch FPC is bonded to the second substrate and electrically connected to a second driving element; and
    a touch sensing unit disposed on the second substrate and electrically connected to the touch FPC, wherein the main FPC and the touch FPC are laterally juxtaposed when viewed in a direction generally normal to the central area.

2. The touch sensing structure as claimed in claim 1, wherein the recess has a triangular, rectangular, trapezoidal, hexagonal, or octangonal shape.

3. The touch sensing structure as claimed in claim 1, wherein the exposed portion of the first substrate is at a corner of the first substrate.

4. The touch sensing structure as claimed in claim 1, wherein the exposed portion of the first substrate is substantially in a middle region of the border area.

5. The touch sensing structure as claimed in claim 1, wherein each of the first substrate and the second substrate comprises glass or plastic.

6. The touch sensing structure as claimed in claim 1, wherein the display panel further comprises a display medium between the first substrate and second substrate.

7. The touch sensing structure as claimed in claim 6, wherein the display medium is liquid crystal.

8. The touch sensing structure as claimed in claim 6, wherein the display medium is an organic light-emitting material.

9. The touch sensing structure as claimed in claim 1, wherein the first substrate is a thin film transistor array substrate.

10. The touch sensing structure as claimed in claim 9, wherein the second substrate is a color filter substrate.

11. The touch sensing structure as claimed in claim 1, wherein the touch sensing unit is a touch panel.

12. The touch sensing structure as claimed in claim 1, wherein the touch sensing unit comprises a plurality of touch sensing electrodes.

13. The touch sensing structure as claimed in claim 1, wherein the first driving element is disposed on the first substrate in the border area.

14. The touch sensing structure as claimed in claim 1, wherein the second driving element is disposed on the second substrate in the border area.

15. The touch sensing structure as claimed claim 1, wherein the first driving element is integrated onto the main FPC.

16. The touch sensing structure as claimed claim 1, wherein the second driving element is integrated onto the touch FPC.

17. The touch sensing structure as claimed in claim 1, wherein the touch sensing structure further comprises a cover substrate over the touch sensing unit.

18. The touch sensing structure as claimed in claim 1, further comprising a sealant between the first substrate and the second substrate for sealing the display medium therein.

19. The touch sensing structure as claimed in claim 18, wherein the sealant is formed following a contour of the second substrate.

20. The touch sensing structure as claimed in claim 18, wherein an additional sealant is used in an area next to the recess.

* * * * *